United States Patent
Beiler et al.

(10) Patent No.: US 10,464,463 B2
(45) Date of Patent: Nov. 5, 2019

(54) MOBILE STORAGE DEVICE

(71) Applicant: New Heights, LLC, Leola, PA (US)

(72) Inventors: Aaron Jay Beiler, Gap, PA (US); Raymond Beiler, Gap, PA (US)

(73) Assignee: New Heights, LLC, Leola, PA (US)

( * ) Notice: Subject to any disclaimer, the term of this patent is extended or adjusted under 35 U.S.C. 154(b) by 148 days.

(21) Appl. No.: 15/234,246

(22) Filed: Aug. 11, 2016

(65) Prior Publication Data

US 2018/0043811 A1 Feb. 15, 2018

(51) Int. Cl.
*B60P 1/34* (2006.01)
*B62D 51/04* (2006.01)

(52) U.S. Cl.
CPC ............... *B60P 1/34* (2013.01); *B62D 51/04* (2013.01)

(58) Field of Classification Search
CPC ............... B60P 1/34; B60P 1/286; B60P 3/00
See application file for complete search history.

(56) References Cited

U.S. PATENT DOCUMENTS

| | | |
|---|---|---|
| 172,454 A | 1/1876 | Kramer |
| 545,264 A | 8/1895 | Booth et al. |
| 1,390,122 A | 9/1921 | Carlson |
| 1,497,489 A | 6/1924 | Cochran |
| 1,546,261 A | 7/1925 | Spencer |
| 1,942,319 A | 1/1934 | Wright |
| 1,985,169 A | 12/1934 | Howell et al. |
| 2,178,841 A | 11/1939 | Lienemann |
| 2,332,326 A | 10/1943 | Lex |
| 2,345,159 A | 3/1944 | Schroter |
| 2,387,568 A | 10/1945 | Drott et al. |
| 2,391,948 A | 1/1946 | Couse |
| 2,427,132 A | 9/1947 | Godbey |
| 2,436,017 A | 2/1948 | Powers |
| 2,867,339 A | 1/1959 | Nelson |
| 3,019,054 A | 1/1962 | Stahly |
| 3,035,722 A | 5/1962 | Anderson et al. |
| 3,092,273 A | 6/1963 | Schramm |
| 3,106,304 A | 10/1963 | Smale |
| 3,473,679 A | 10/1969 | Weichel |
| 3,619,007 A | 11/1971 | Phillips |
| 3,768,670 A | 10/1973 | Cloud |
| 3,800,966 A | 4/1974 | Newton |
| 3,902,616 A | 9/1975 | Santic et al. |
| 175,385 A | 3/1976 | Steward |
| 3,987,563 A | 10/1976 | Boos |

(Continued)

FOREIGN PATENT DOCUMENTS

FR 2268666 A1 11/1975
FR 2750411 A1 * 1/1998 ............ B62D 59/04
(Continued)

OTHER PUBLICATIONS

Abstract of FR 2867432 A1, dated Sep. 16, 2005, 1 page.
PCT Notification, International Search Report and Written Opinion, dated Mar. 31, 2016, 12 pages.

*Primary Examiner* — Hilary L Gutman
(74) *Attorney, Agent, or Firm* — Barley Snyder

(57) ABSTRACT

A mobile storage device is disclosed. The mobile storage device comprises a frame, an extension device, a storage bin, and a control system. The extension device is rotatably connected to the frame. The storage bin is secured to the extension device. The control system is rotatably connected to the frame.

43 Claims, 14 Drawing Sheets

(56) References Cited

U.S. PATENT DOCUMENTS

| | | | |
|---|---|---|---|
| 4,091,943 A | | 5/1978 | Bay-Schmith |
| 4,447,041 A | * | 5/1984 | Fujita .................. B66F 7/0625 |
| | | | 254/122 |
| 4,568,028 A | | 2/1986 | Verseef et al. |
| 4,655,466 A | * | 4/1987 | Hanaoka .................. B62B 3/02 |
| | | | 108/145 |
| 4,676,330 A | | 6/1987 | Roberts |
| 4,700,851 A | | 10/1987 | Reeve et al. |
| 4,840,532 A | | 6/1989 | Galbreath |
| 4,951,999 A | | 8/1990 | Rudolph et al. |
| 5,000,645 A | | 3/1991 | Poloja/ rvi |
| 5,018,931 A | * | 5/1991 | Uttley ..................... A61G 7/08 |
| | | | 188/5 |
| 5,069,507 A | | 12/1991 | Vurness |
| 5,193,649 A | * | 3/1993 | Lee ..................... B66F 7/0625 |
| | | | 182/141 |
| 5,249,642 A | * | 10/1993 | Kishi .................. B66F 11/046 |
| | | | 182/19 |
| 5,393,193 A | | 2/1995 | Dagg |
| 5,454,625 A | * | 10/1995 | Christensen ............. B62B 3/08 |
| | | | 187/244 |
| 5,490,755 A | | 2/1996 | Billotte |
| 5,492,402 A | | 2/1996 | Alton |
| 5,542,803 A | | 8/1996 | Driggs |
| 5,580,134 A | | 12/1996 | Allwine |
| 5,662,453 A | | 9/1997 | Gerstner |
| 5,720,526 A | | 2/1998 | Roberts |
| 5,829,605 A | | 11/1998 | Poitras |
| 5,975,832 A | | 11/1999 | Winkler |
| 6,019,568 A | | 2/2000 | Bratlie |
| 6,042,175 A | | 3/2000 | Williams |
| 6,129,226 A | | 10/2000 | Donovan |
| 6,217,122 B1 | | 4/2001 | Kirbie |
| 6,220,811 B1 | | 4/2001 | Bernecker |
| 6,238,166 B1 | | 5/2001 | Collier |
| 6,254,192 B1 | | 7/2001 | Spreitzer |
| 6,257,358 B1 | * | 7/2001 | Roach .................. B62D 51/005 |
| | | | 180/19.1 |
| 6,309,164 B1 | | 10/2001 | Holder et al. |
| 6,386,573 B1 | | 5/2002 | Solomon |
| 6,402,224 B1 | | 6/2002 | Monaco et al. |
| 6,409,275 B1 | | 6/2002 | Gerding |
| 6,527,494 B2 | | 3/2003 | Hurlbert |
| 6,547,509 B1 | * | 4/2003 | Edmo .................. B66F 7/0641 |
| | | | 187/269 |
| 6,558,104 B1 | | 5/2003 | Vlaanderen et al. |
| 6,688,836 B2 | | 2/2004 | Gourand |
| 6,789,829 B1 | | 9/2004 | Kapels |
| 6,817,677 B1 | | 11/2004 | Beiler |
| 7,037,062 B2 | | 5/2006 | Oliver |
| 7,172,083 B1 | | 2/2007 | Raines |
| 7,641,011 B2 | * | 1/2010 | Fridlington, Jr. ..... B62B 3/0618 |
| | | | 180/68.5 |
| 7,665,285 B1 | | 2/2010 | Harada et al. |
| 7,743,859 B2 | | 6/2010 | Forsyth |
| 8,136,270 B1 | | 3/2012 | Wammock |
| 8,215,717 B2 | | 7/2012 | Stewart |
| 8,876,216 B2 | | 11/2014 | Stewart |
| 9,132,848 B2 | * | 9/2015 | Sekine ................ B66F 9/07586 |
| 9,327,632 B1 | * | 5/2016 | Bartel ...................... B60P 1/34 |
| 2002/0011815 A1 | * | 1/2002 | Gaffney ............. B60L 11/1805 |
| | | | 318/560 |
| 2005/0253445 A1 | * | 11/2005 | Beiler ...................... B60P 1/16 |
| | | | 298/22 C |
| 2008/0211289 A1 | | 9/2008 | Beiler |
| 2009/0242285 A1 | * | 10/2009 | Whetstone, Jr. ... B62D 49/0692 |
| | | | 180/19.2 |
| 2009/0277857 A1 | | 11/2009 | Rice |
| 2010/0078905 A1 | * | 4/2010 | Holtan .................. B62B 3/1404 |
| | | | 280/47.11 |
| 2012/0168237 A1 | * | 7/2012 | Oliphant ............... H01M 10/44 |
| | | | 180/65.1 |
| 2013/0133172 A1 | | 5/2013 | Kiener et al. |

FOREIGN PATENT DOCUMENTS

| | | |
|---|---|---|
| FR | 2867432 A1 | 3/2010 |
| JP | 401052538 A | 2/1989 |
| WO | 2004083081 A2 | 9/2004 |

* cited by examiner

US 10,464,463 B2

MOBILE STORAGE DEVICE

FIELD OF THE INVENTION

The invention relates to a mobile storage device, and more particularly, to a mobile storage device having a rear extending storage bin.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around the typical landscaped yard surrounding a building and position a storage bin into an extended position near workers.

SUMMARY

In view of the foregoing, a mobile storage device is provided. The mobile storage device includes a frame, an extension device, a storage bin, and a control system. The extension device is rotatably connected to the frame. The storage bin is secured to the extension device. The control system is rotatably connected to the frame.

BRIEF DESCRIPTION OF THE DRAWINGS

The invention is explained in greater detail below with reference to embodiments and the appended drawings, of which.

DETAILED DESCRIPTION OF THE EMBODIMENT(S)

The invention is explained in greater detail below with reference to embodiments of a mobile storage device. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
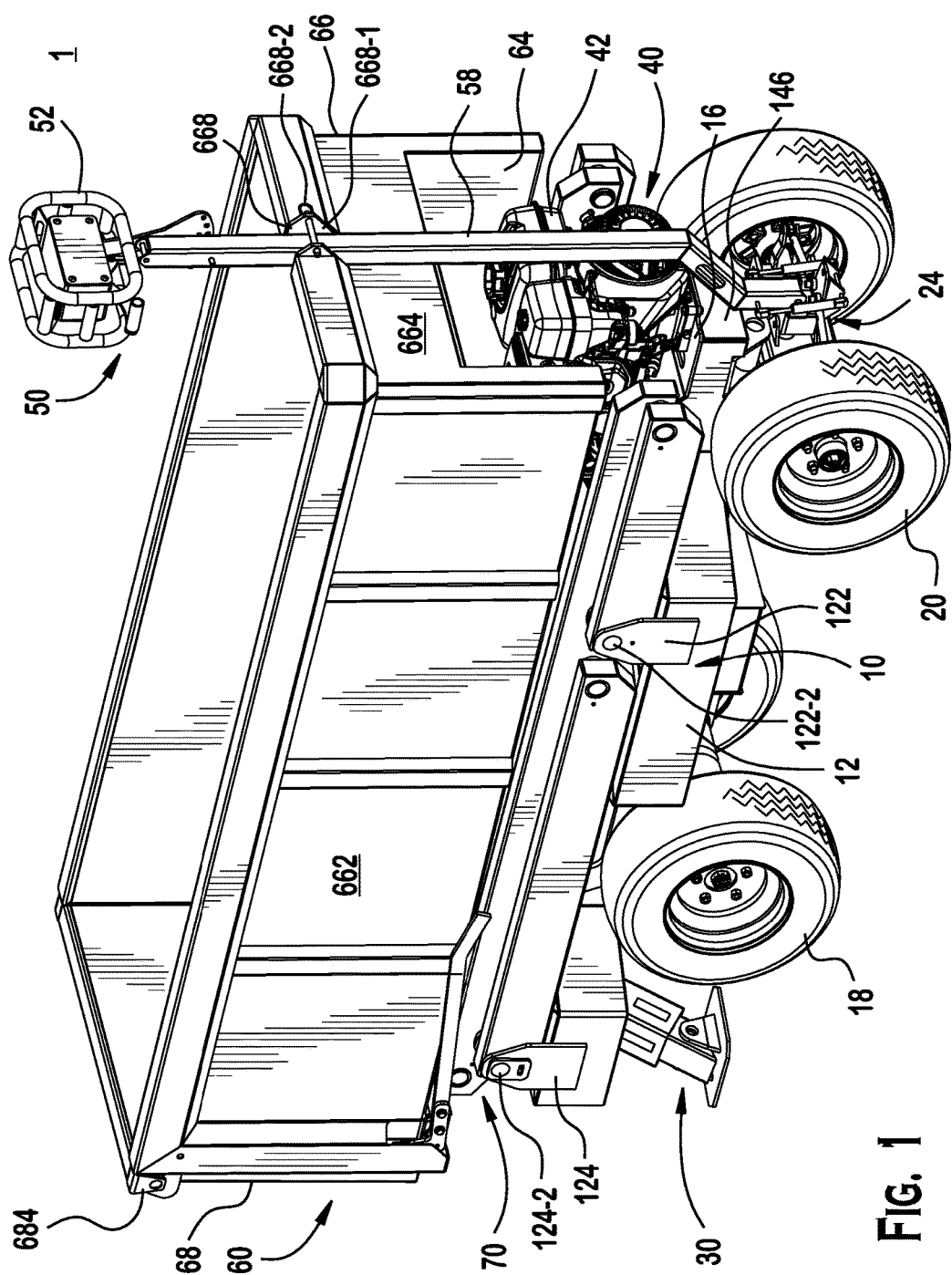
FIG. 1 is a perspective view of a mobile storage device according to the invention.
Figure 2:
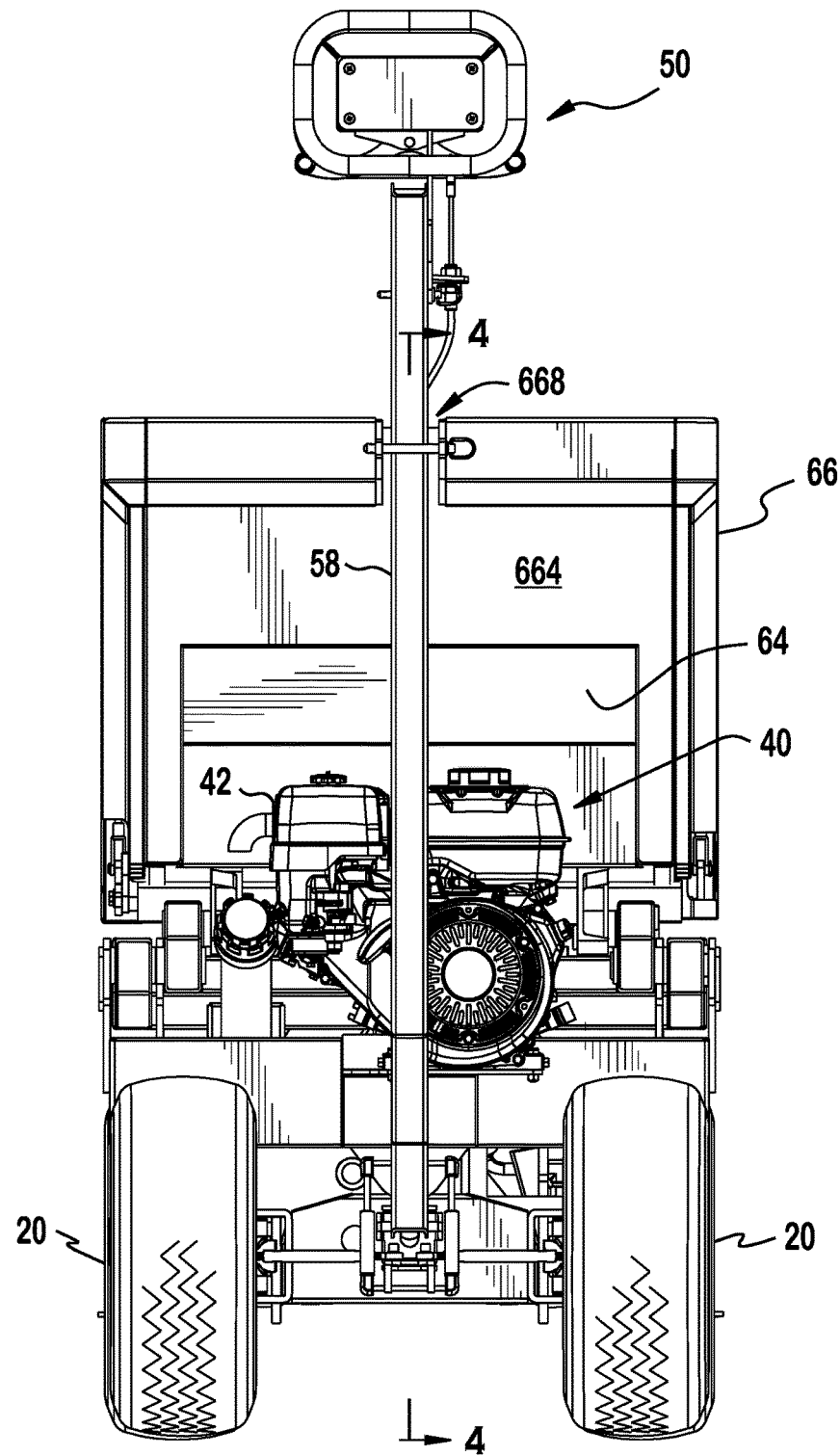
FIG. 2 is a front view of the mobile storage device of FIG. 1.

A mobile storage device 1 according to the invention is shown generally in FIG. 1. The mobile storage device 1 includes the following major components: a frame 10, a stabilizer 30, a power system 40, a control system 50, a storage bin 60, and an extension device 70.

Now with reference to FIGS. 1, 5, and 6, the frame 10 will be discussed. In the shown embodiment, the frame 10 includes a plurality of support beams 12, a plurality of connecting beams 142-146, a power system support 16, a pair of drive wheels 18, a pair of steerable wheels 20, and a steering pivot assembly 24.

Figure 5:
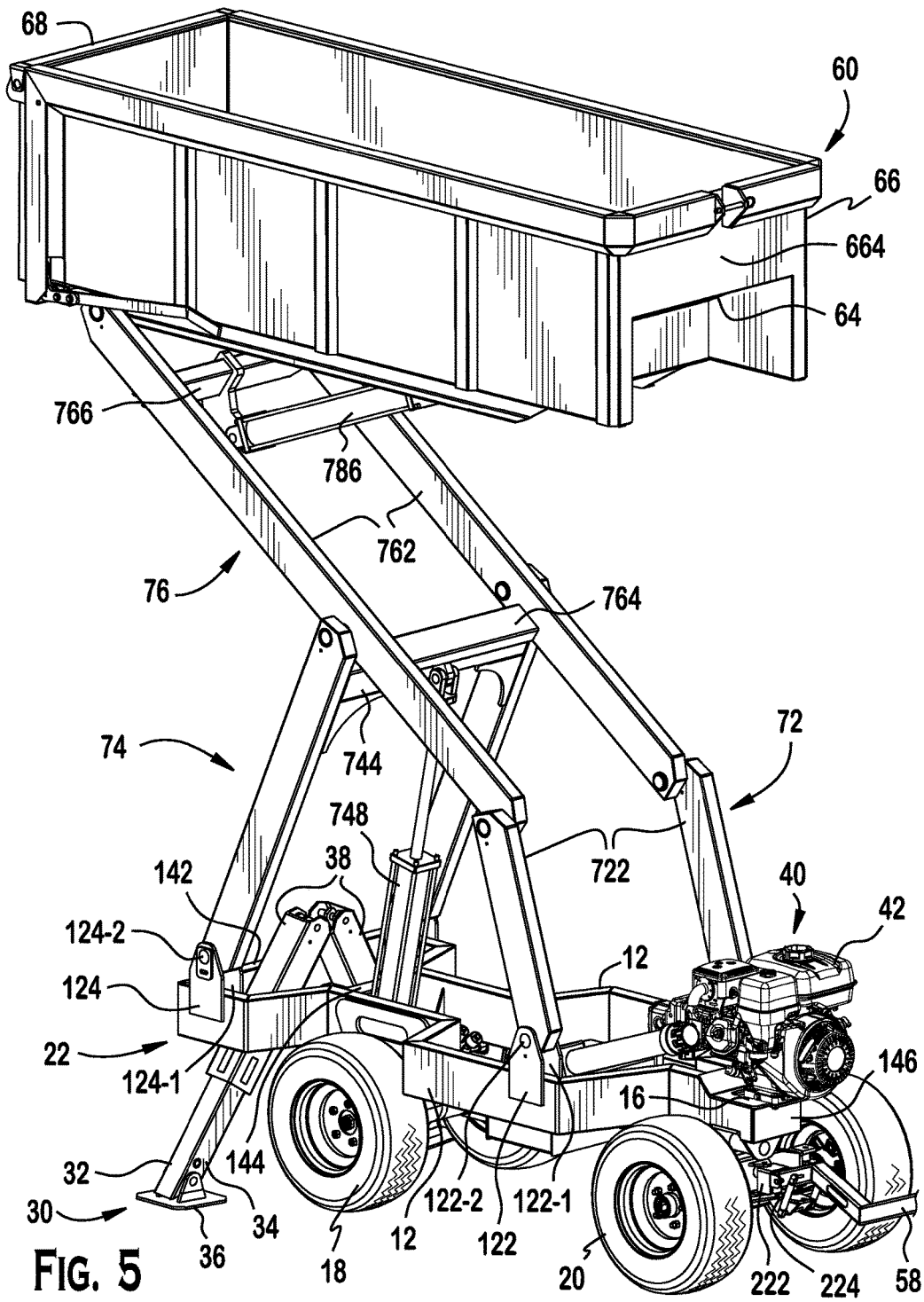
FIG. 5 is a front perspective view of the mobile storage device of FIG. 1 shown with an extended storage bin.
Figure 6:
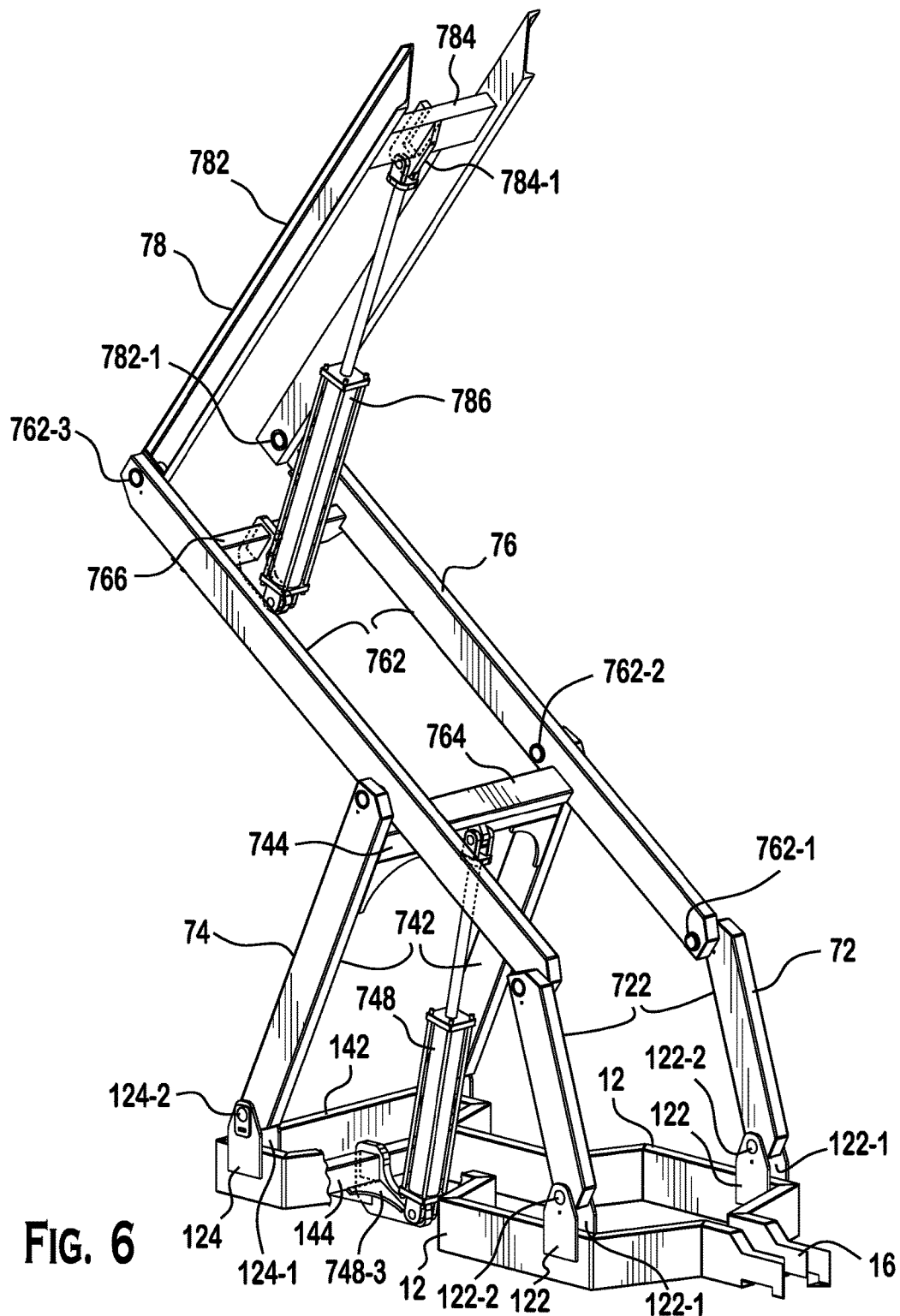
FIG. 6 is a perspective view of an extension device and a frame of the mobile storage device of FIG. 1.

As shown in FIGS. 1, 5, and 6, each support beam 12 is an elongated metal support extending along a length of the frame 10, from a trailing end to a leading end thereof. Each support beam 12 may have a rectangular cross-section.

Each support beam 12 includes a first extension receiving bracket 122 positioned between a leading end and a trailing end of the frame 10, and a second extension receiving bracket 124 positioned along the trailing end. In the shown embodiment, the first extension receiving bracket 122 is positioned approximately centrally between the leading edge and trailing edge of the frame 10. Each first extension receiving bracket 122 includes first support arm receiving space 122-1 and a first fastener receiving through-hole 122-2 extending completely there through. Each second extension receiving bracket 124 includes second support arm receiving space 124-1 and a second fastener receiving through-hole 124-2 extending completely there through.

Each connecting beam 142-146 runs substantially perpendicular to and connects the plurality of support beams 12 to form an undercarriage chassis 22. Each connection is provided, for instance, using a mechanical weld. However, one skilled in the art should appreciate that fasteners, such as bolts, nuts, screws, and adhesives could be used.

Figure 4:
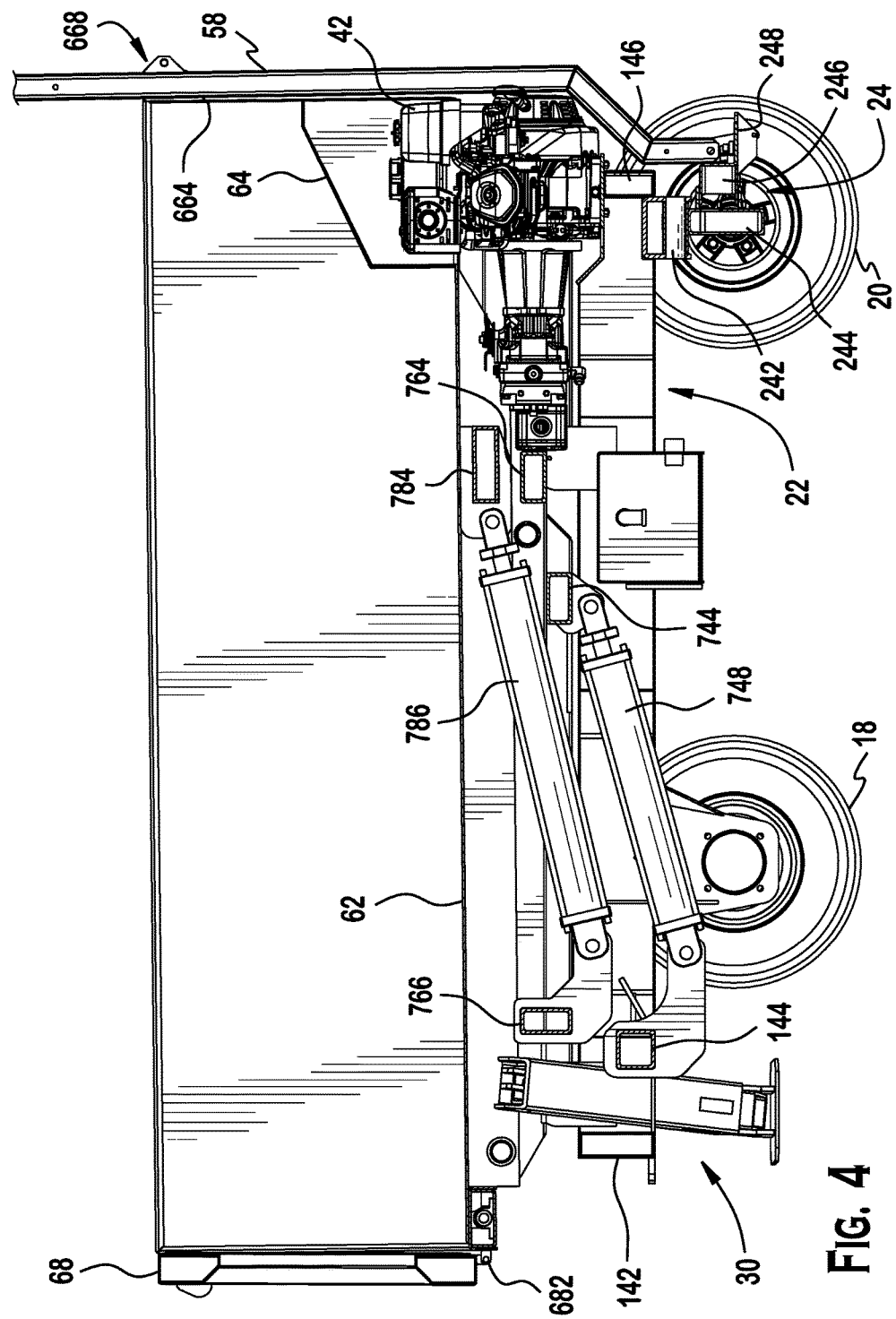
FIG. 4 is a sectional side view of the mobile storage device of FIG. 1, taken along line 4-4 of FIG. 2.

First connecting beam 142 is positioned along the trailing edge of the frame 10, while second connecting beam 144 is positioned between the leading edge and the trailing edge to connect the plurality of support beams 12. In the shown embodiment, the second connecting beam 144 is positioned offset from the trailing edge. The third connecting beam 146 is positioned along the leading edge of the frame to connect the plurality of support beams 12. As shown in FIG. 4, the first connecting beam 142 and the third connecting beam 146 may have a rectangular cross-section similar to the plurality of support beams 12, while the second connecting beam 144 may have a square cross-section. A bottom of the second connecting beam 144 may align with the bottom of the plurality of support beams 12, the second connecting beam 144 extending vertically only part of a height of the support beams 12.

The power system support 16, shown in FIGS. 1 and 5, is positioned at the leading edge of the frame 10. The power system support 16 is a planar surface extending parallel to the length of the plurality of support beams 12, connecting the plurality of support beams 12 at the leading edge.

Both the drive wheels 18 and the steerable wheels 20 are positioned under the undercarriage chassis 22. In the embodiment shown in FIG. 1, the drive wheels 18 are positioned proximate the trailing edge, while the steerable wheels 20 are positioned at the leading edge. One with ordinary skill in the art would appreciate that other designs are possible; the steerable wheels 20, for instance, may alternatively be positioned at different positions along the undercarriage chassis 22.

The steerable wheels 20 are pivotably attached to the frame 10 via the steering pivot assembly 24. The steering pivot assembly 24, as shown in FIGS. 1, 4, 9, and 10, includes a steering bracket member 242, a steerable wheel axle 244, a front brace 246, a steering member receiving bracket 248, a pair of steering arms 252, and a pair of wheel brackets 254. Steering bracket member 242 is attached to the leading edge of the frame 10 and extends vertically downward from the leading edge. The steerable wheel axle 244, which connects the pair of steerable wheels 20, is attached to the frame 10 via the steering bracket member 242. A first side of the front brace 246 is pivotably attached to a side of the steerable wheel axle 244 facing away from the mobile storage device 1. The steering member receiving bracket 248 is attached to an opposite second side of the front brace 246. Each one of the pair of wheel brackets 254 is positioned on an end of the steerable wheel axle 244 and connected to one of the pair of steerable wheels 20. Each one of the pair of steering arms 252 connects one of the pair of wheel brackets 254 to the steering member receiving bracket 248.

The stabilizer 30 will now be discussed with reference to FIGS. 1, 4, and 5. In the shown embodiment, the stabilizer 30 is positioned near the rear of the mobile storage device 1. However, one skilled in the art would appreciate that other designs are possible, including varying the positioning and number of stabilizers 30.

The stabilizer 30 includes a pair of outriggers 32 and a pair of stabilizing actuators 38. As shown in FIGS. 1, 4, and 5, the pair of stabilizing actuators 38 may form a V-shape. An arm 34 of each outrigger 32 is positioned within a stabilizing actuator 38, and can slide with respect to the stabilizing actuator 38 to form an extension. A planar brace 36 is pivotably connected to an end of each arm 34.

The power system 40 will now be discussed with reference to FIGS. 1, 4, and 5. In the shown embodiment, the power system 40 includes an engine 42, a battery (not shown) connected to the engine 42, a hydraulic motor (not shown) also connected to the engine 42, a hydraulic pump (not shown) connected to the hydraulic motor (not shown). Many of the power system 40 components are not shown for sake of complexity in the drawings, although a discussion is provided for purposes of enabling one skilled in the art to understand how the power system 40 is assembled and performs.

The engine 42, such as an internal combustion engine, as shown, powers the power system 40. However, the power system 40 could be powered by other known mechanisms including an electric motor powered by a battery or other sources. In the shown embodiment, the power system 40 is interconnected with drive wheels 18 by a hydraulic motor (not shown) installed adjacent to the drive wheels 18 and interconnected to the hydraulic pump (not shown) by hydraulic lines.

One skilled in art should appreciate that other designs are possible. For instance, the power system 40 may include other methods to move the drive wheels 18, including chains, belts, or a drive shaft and a transmission connected to the engine 42, so that the mobile storage device 1 can be moved around a work site under its own power.

The control system 50 will now be described with reference to FIGS. 1, 11, and 12. The control system 50 includes an operator input interface 52 and a steering link 58.

Figure 11:
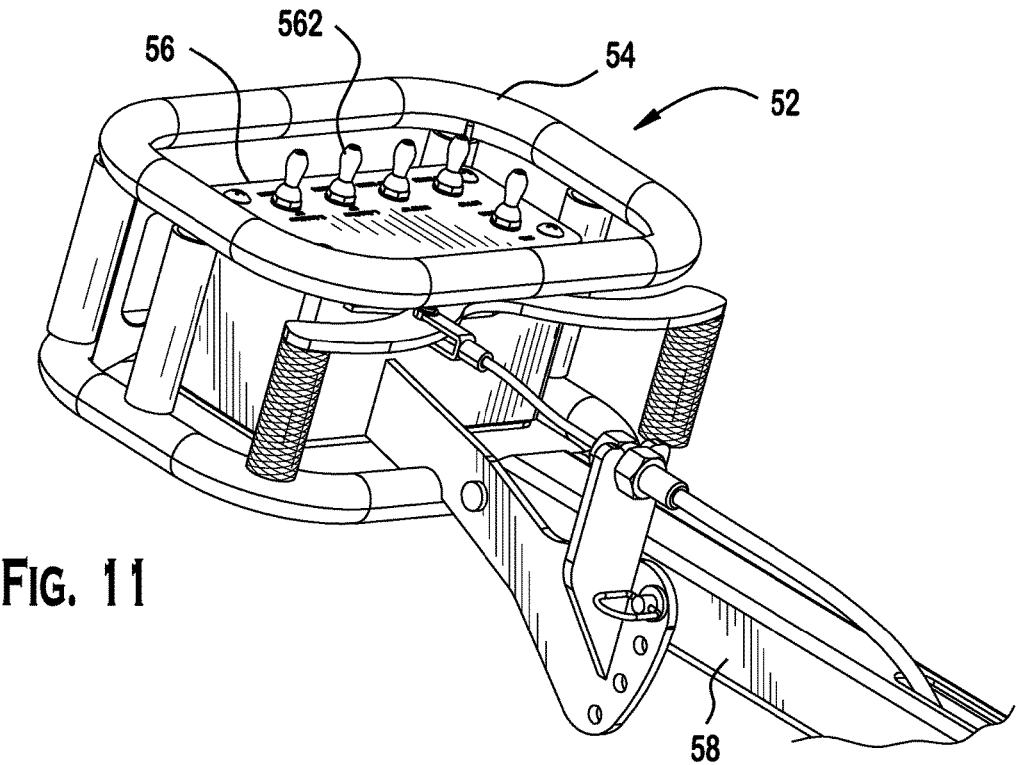
FIG. 11 is a perspective view of a control system of the mobile storage device of FIG. 1.
Figure 12:
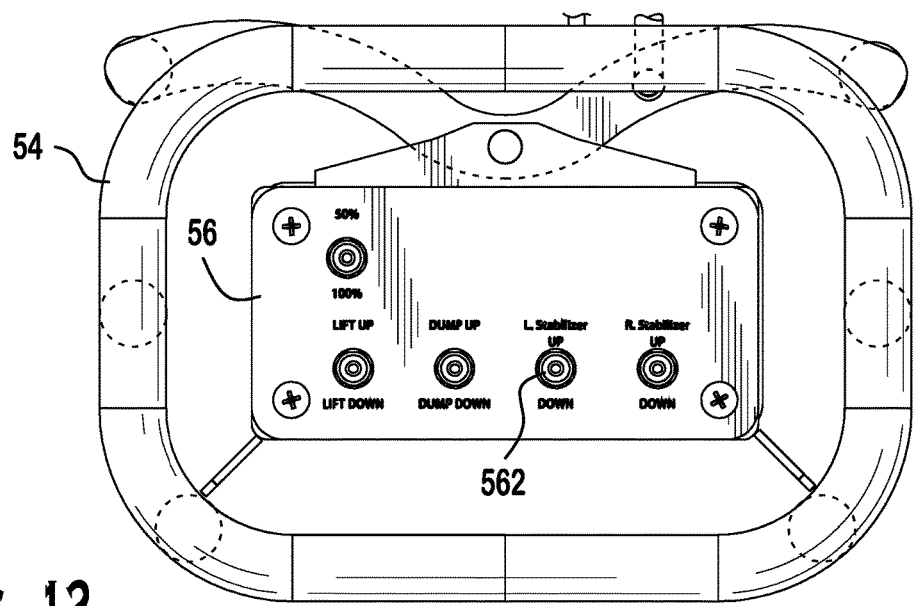
FIG. 12 is a front view of a part of the control system of FIG. 11.
Figure 15:
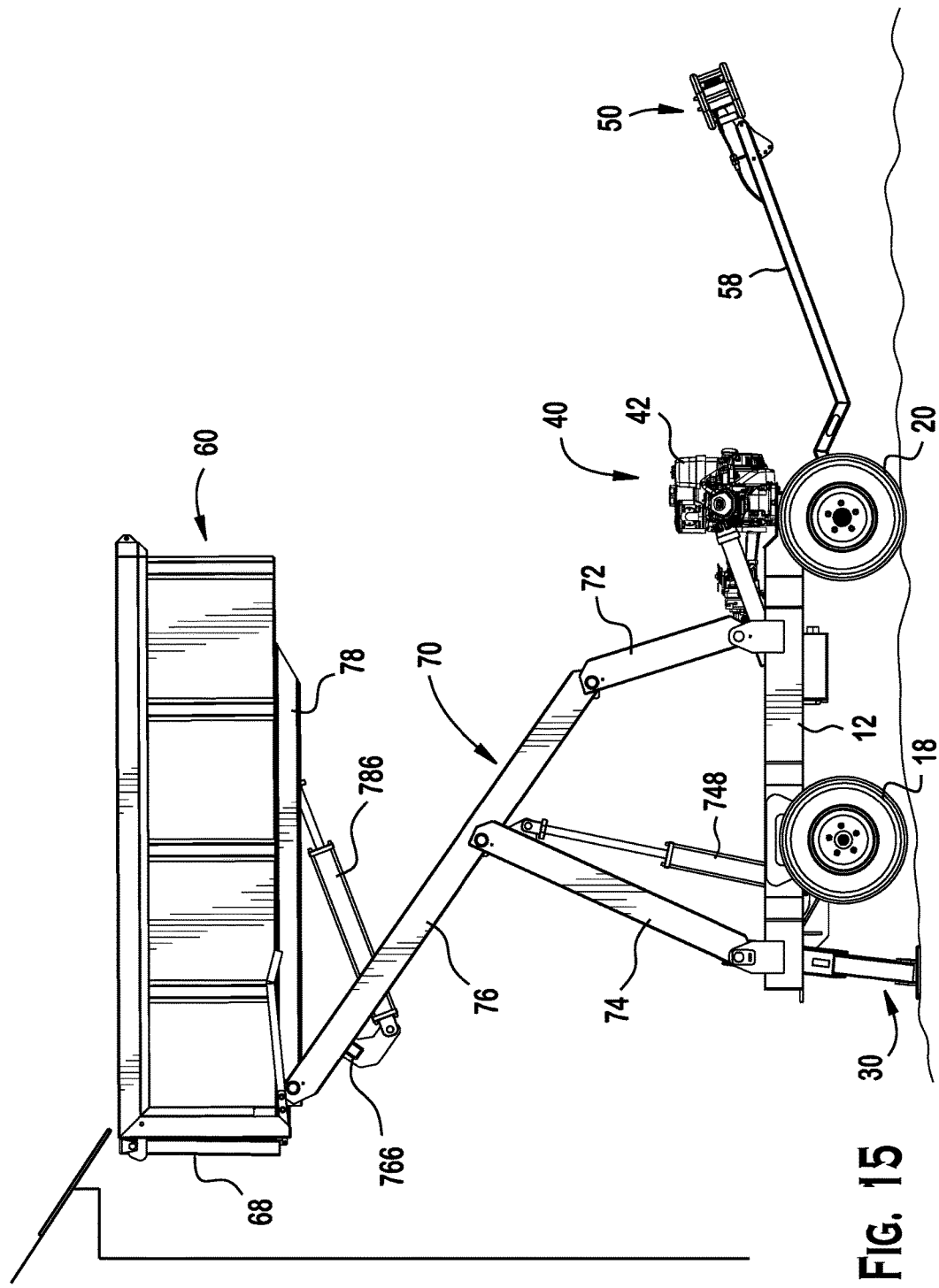
FIG. 15 is a side view of an extended mobile storage device of FIG. 1.

The operator input interface 52, as shown in FIGS. 11 and 12, includes a handle 54 and a control panel 56. In the shown embodiment, the handle 54 extends around the control panel 56 and is sized to permit manual manipulation by an operator. The control panel 56 includes a plurality of control elements 562 which allow the operator to control various aspects of the mobile storage device 1, as will be described below in greater detail. The control elements 562 may include a speed control element, a braking control element, a lifting control element, a tilting control element, a stabilizer control element, and any other control elements related to the operation of the mobile storage device 1. The control elements 562 may be toggle switches as shown in the embodiment of FIG. 15. As would be understood by one with ordinary skill in the art, the plurality of control elements 562 may alternatively be a series of buttons, levers, or other suitable controls. The steering link 58 is an elongated shaft attached to and extending away from the handle 54. At an end opposite the handle 54, the steering link 58 has a fastener receiving through-hole 582 extending completely there through.

The storage bin 60 will now be described with reference to FIGS. 1, 3, 4, 14, and 16. The storage bin 60 generally includes a platform 62, a cutout section 64, a plurality of retaining walls 66, and a tailgate 68.

The platform 62, as shown in FIG. 4, includes a planar section forming a bottom surface of the storage bin 60 and extending substantially parallel with the frame 10. In the shown embodiment, the platform 62 is a rectangular metal plate. However, one skilled in the art should appreciate that the platform 62 could be manufactured using different shapes and other materials, such as lumber, composite, and other metals. For instance, the platform 62 may include a framed metal structure on which a plurality of wood planks is arranged.

The cutout section 64 extends from an end of the platform 62, and is shaped to accommodate other elements of the mobile storage device 1 exterior of the storage bin 60, including the power system 40 and, more particularly, the. As shown in FIG. 1, the cutout section 64 may be narrower than the platform 62. One skilled in the art should appreciate that the cutout section 64 may be a range of widths relative to the platform 62. The cutout section 64 may be a shaped metal plate, however, one skilled in the art should appreciate that the cutout section 64 could be manufactured using different shapes and other materials, such as lumber, composite, and other metals. For instance, the cutout section 64 may include a framed metal structure on which a plurality of wood planks is arranged.

The plurality of retaining walls 66 includes a pair of side retaining walls 662 and a retaining end wall 664. In the shown embodiment, each retaining wall 66 is metal plate. However, one skilled in the art should appreciate that each retaining wall 66 could be manufactured using other materials, such as lumber, composite, and other metals. For instance, each retaining wall 66 may include a framed metal structure on which a plurality of wood planks is disposed along the framed metal structure.

The retaining walls 66 are positioned and secured along outer edges of the platform 62 and cutout section 64 and, in particular, along a top planar surface thereof. The retaining walls 66 are firmly secured to the platform 62 and cutout section 64 using mechanical welds. In the shown embodiment, the side retaining walls 662 are positioned along opposite longitudinal sides of the platform 62 and cutout section 64, while the retaining end wall 664 is positioned around a leading end of the cutout section 64. Each retaining wall 66 extends substantially perpendicular with respect to the top planar surface of the platform 62 and cutout section 64. Each retaining wall 66 is mechanically secured to the platform 62 and cutout section 64, for instance, using a weld or a plurality of known mechanical fasteners. In addition, the retaining end wall 664 is secured to a pair of common ends of the side retaining walls 662. In the embodiment shown, the retaining end wall 664 is mechanically secured to the pair of side retaining walls 662, for instance, using a weld or other known mechanical fasteners or adhesives.

As shown, each side retaining walls 662 includes a plurality of wall supports 662-2. The wall supports 662-2 provide reinforcement for the planar surfaces of each of the side retaining walls 662. In the shown embodiment, each wall support 662-2 is a tubular structure of metal that is mechanically secured to an outer surface of the side retaining wall 662, for instance, using a weld. However, one skilled in the art should appreciate that other known fastening means are possible, including but not limited to screws, nuts and bolts, and adhesives.

As shown, the retaining end wall 664 includes a link securing member 668 positioned along a top end thereof. The link securing member 668 includes a link securing passageway 668-1 extending through a portion of the retaining end wall 664 and a link fastener 668-2 capable of removably enclosing the link securing passageway 668-1. The link fastener 668-2 may be a pin as shown in the embodiment of FIG. 1, but one skilled in the art would understand that other designs are possible.

Figure 3:
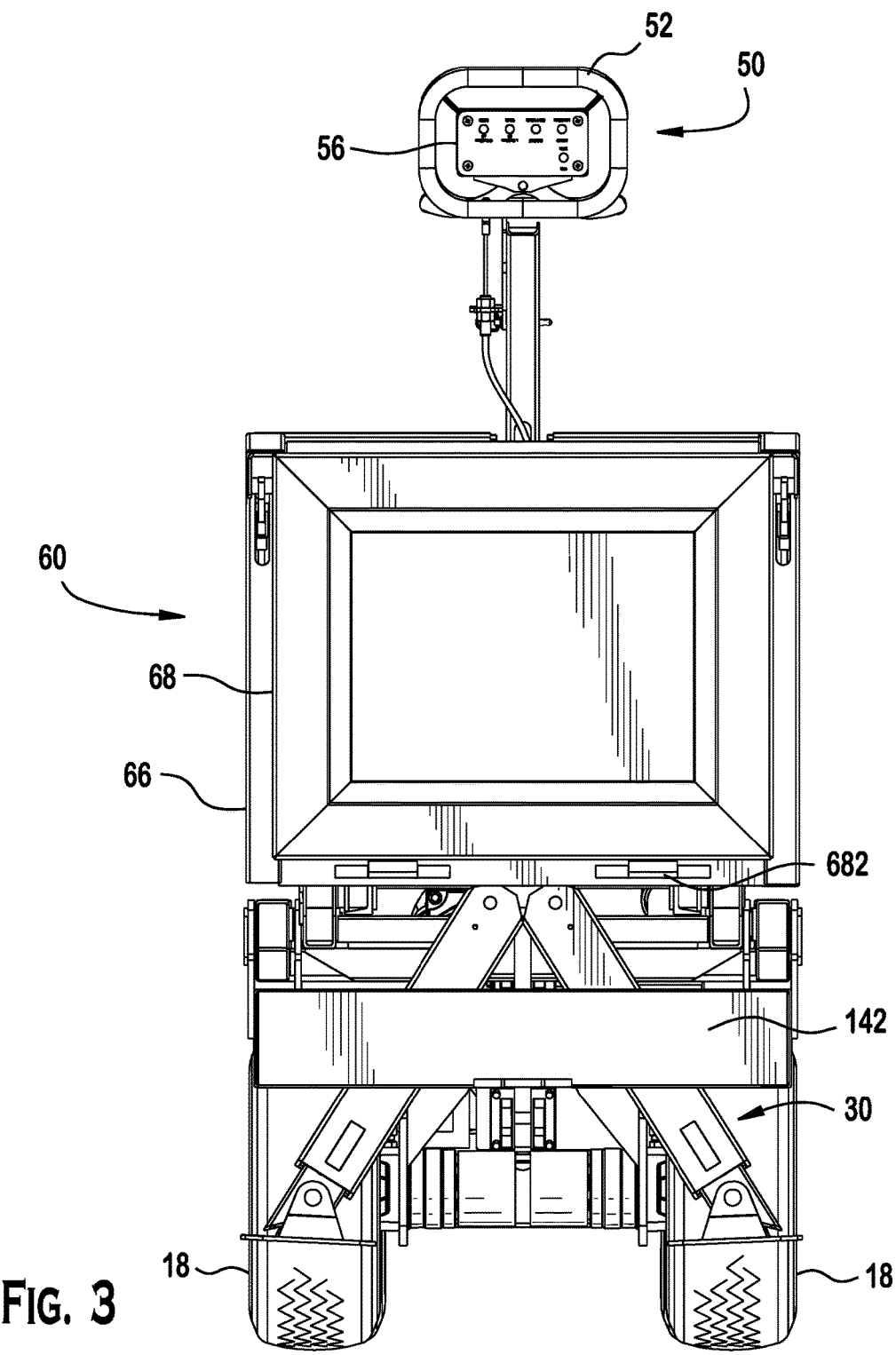
FIG. 3 is a rear view of the mobile storage device of FIG. 1.
Figure 14:
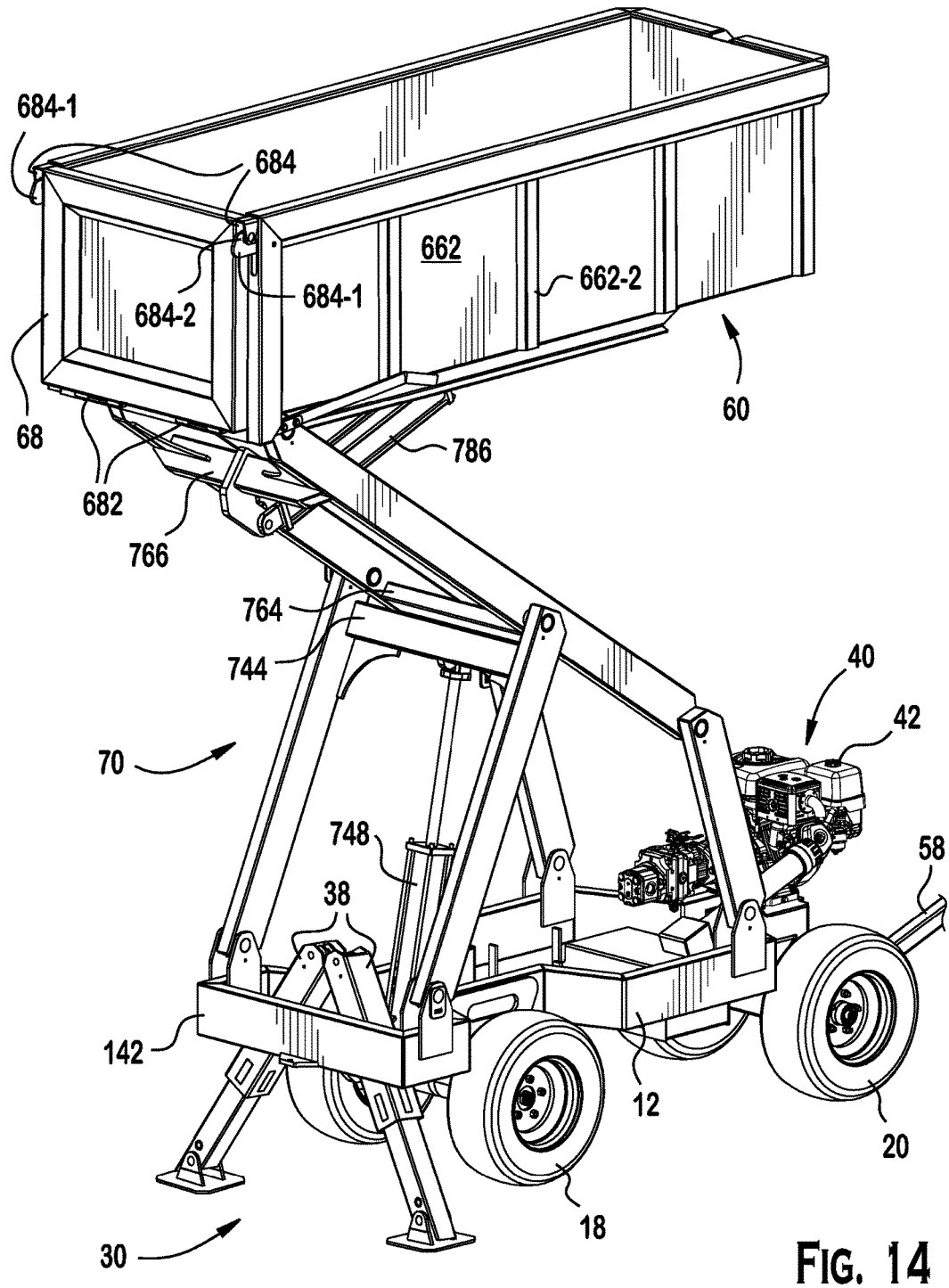
FIG. 14 is a rear perspective view of an extended mobile storage device of FIG. 1.

The tailgate 68, as shown in FIGS. 1, 3, and 14, is positioned along an outer edge of the platform 62 and extends substantially perpendicular to the top planar surface thereof. A first side of the tailgate 68 is secured to the platform 62, for instance, through a rotating fastener device, such as a rotating hinge 682 positioned at a bottom of the tailgate 68 and connecting to the platform 62. The rotating hinge 682 permits rotation of the tailgate 68 about the first side from a secured closed vertical position to one in which the tailgate 68 rotates away from the retaining end wall 664 making the platform 62 and cutout section 64 accessible. However, one skilled in the art should appreciate that other designs are possible. For instance, the tailgate 68 may be pivotably mounted to side retaining walls 662 such that the tailgate 68 pivots away from the outer edge of the platform 62 or from the side retaining walls 662, much like known dump trucks.

The tailgate 68 also includes a pair of tailgate latches 684, each tailgate latch 684 removably securing an opposite second side of the tailgate 68 to a top of a side retaining wall 662. As shown in FIG. 14, in an embodiment, each tailgate latch 684 may include a latch member 684-1 secured to the top of a side retaining wall 662 and a mating latch member 684-2 positioned on the second side of the tailgate 68. In the embodiment of FIG. 14, the latch member 684-1 is a hook and the mating latch member 684-2 is a bar capable of being received by the hook, but one skilled in the art would understand that other designs are possible.

The extension device 70 will now be described with reference to FIGS. 6-8. As shown, the extension device 70 includes the following major components: a first base extension section 72, a second base extension section 74, an intermediate extension section 76, and a storage bin platform section 78.

Figure 7:
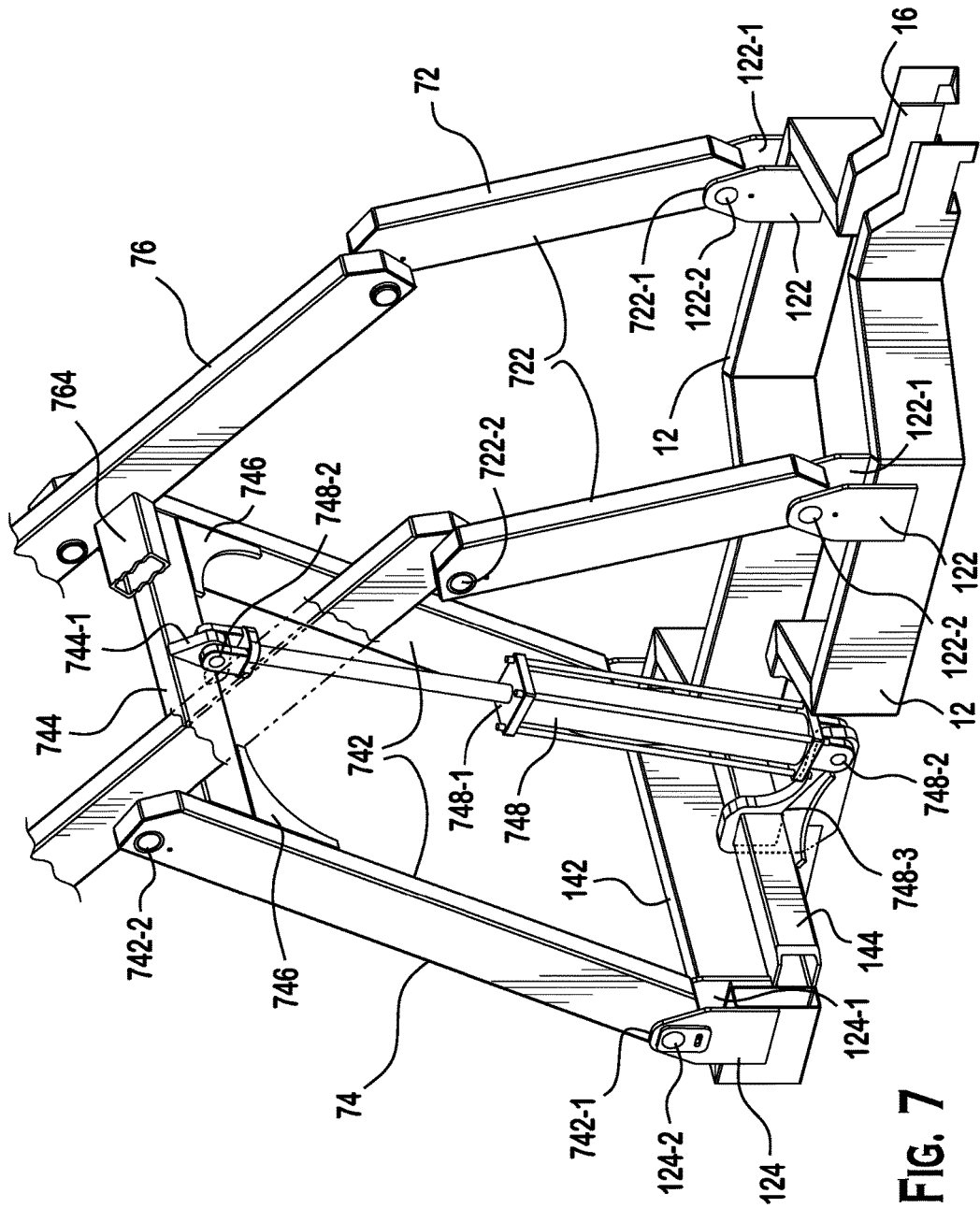
FIG. 7 is an enlarged perspective view of the frame and part of the extension device of FIG. 6.

With reference to FIGS. 6 and 7, the first base extension section 72 and the second base extension section 74 are shown. The first base extension section 72 generally includes a pair of first lower supports 722. Each first lower support 722 is an elongated structural beam and, in the shown embodiment, a tubular metal beam. Each first lower support 722 includes a first fastener receiving through-hole 722-1 positioned at a leading end thereof and extending completely there through, and a second fastener receiving through-hole 722-2 positioned at a trailing end thereof and extending completely there through. The pair of first lower supports 722 are positioned parallel to each other.

The second base extension section 74 generally includes a pair of second lower supports 742, a second base extension cross member 744, a pair of braces 746, and a lifting actuator 748.

Each second lower support 742 is an elongated structural beam and, in the shown embodiment, a rectangular metal beam. Each second lower support 742 includes a first fastener receiving through-hole 742-1 positioned at a trailing end thereof and extending completely there through, and a second fastener receiving through-hole 742-2 positioned at a leading end thereof and extending completely there through. The pair of second lower supports 742 are positioned parallel to each other.

The second base extension cross member 744 is positioned proximate the leading edge of each of the second lower supports 742, and as shown in FIG. 7, connects and secures the pair of second lower supports 742 in position. In the shown embodiment, the second base extension cross member 744 is an elongated structural beam. The second base extension cross member 744 is mechanically secured to facing inner surfaces of the pair of second lower supports 742, for instance, using a weld or other known mechanical fasteners. One skilled in the art should appreciate that other shapes and design are possible. For, instance, the second base extension cross member 744 could be manufactured rectangular or tubular.

The second base extension cross member 744 includes a first actuator receiving bracket 744-1 disposed on and mechanically secured to a side thereof In the shown embodiment, each first actuator receiving bracket 744-1 is an eye bracket. However, one skilled in the art should appreciate that other known brackets could be used. In addition, one skilled in the can appreciate that one or more actuator receiving brackets 744-1 can be used and positioned at different locations along the second base extension cross member 744.

Each brace 746 is positioned at opposite ends of second base extension cross member 744 and along inner surfaces of the pair of second lower supports 742. Each brace 746 is mechanically secured to the second base extension cross member 744 and the one of the pair of second lower supports 742, for instance, using a weld or other known mechanical fasteners. Each brace 746 is a metal structural brace, and as in the shown embodiment, may be approximately triangularly shaped.

As shown in FIGS. 6 and 7, the lifting actuator 748 is positioned between and connects the frame 10 and the second base extension section 74. The lifting actuator 748 includes an actuator section 748-1, a pair of fastener sections 748-2, and a base frame bracket 748-3. More particularly, in the shown embodiment, the actuator section 748-1 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure could be used.

Each fastener section 748-2 is positioned at an opposite end of the actuator section 748-1. A fastener section 748-2 connects the actuator section 748-1 to the actuator receiving bracket 744-1, and another fastener section 748-2 connects an opposite end of the actuator section 748-1 to the base frame bracket 748-3. In the shown embodiment, each fastener section 748-2 is a rod clevis. One skilled in the art should appreciate that other known fasteners may be used that are capable of connecting between the frame 10 and the second base extension section 74 through the lifting actuator 748.

A first end of the base frame bracket 748-3 is connected to a fastener section 748-2. The opposite second end of the base frame bracket 748-3 is formed to fixedly receive an elongated structural member, as shown in FIG. 6, and is capable of providing structural support to the lifting actuator 748.

With reference to FIG. 6, the intermediate extension section 76 is shown. The intermediate extension section 76 includes a pair of intermediate supports 762, a first intermediate cross member 764, and a second intermediate cross member 766.

The pair of intermediate supports 762 are elongated structural beams and, in the shown embodiment, a pair of rectangular metal beams. Each intermediate support 762 includes a first fastener receiving through-hole 762-1 positioned at a leading end thereof and extending completely there through, a second fastener receiving through-hole 762-2 positioned between a leading end and a trailing end thereof and extending completely there through, and a third fastener receiving through-hole 762-3 positioned at a trailing end thereof and extending completely there through. The pair of intermediate supports 762 are positioned parallel to each other and connected to each other by the first intermediate cross member 764 and the second intermediate cross member 766.

The first intermediate cross member 764 is positioned between the leading end and the trailing end of the intermediate supports 762. The first intermediate cross member 764 is a metal structural support extending between and secured to the pair of intermediate supports 762. The first intermediate cross member 764 is mechanically secured to facing inner surfaces of the pair of intermediate supports 762, for instance, using a weld or other known mechanical fasteners. One skilled in the art should appreciate that other shapes and design are possible.

The second intermediate cross member 766 is positioned proximate the trailing end of the intermediate supports 762. The second intermediate cross member 766 is a metal structural support extending between and secured to the pair of intermediate supports 762. As especially shown in FIGS. 6 and 15, the second intermediate cross member 766 may be a rectangular member that extends beyond a side of each intermediate support 762 The second intermediate cross member 766 is mechanically secured to facing inner surfaces of the pair of intermediate supports 762, for instance, using a weld or other known mechanical fasteners. One skilled in the art should appreciate that other shapes and design are possible.

Figure 8:
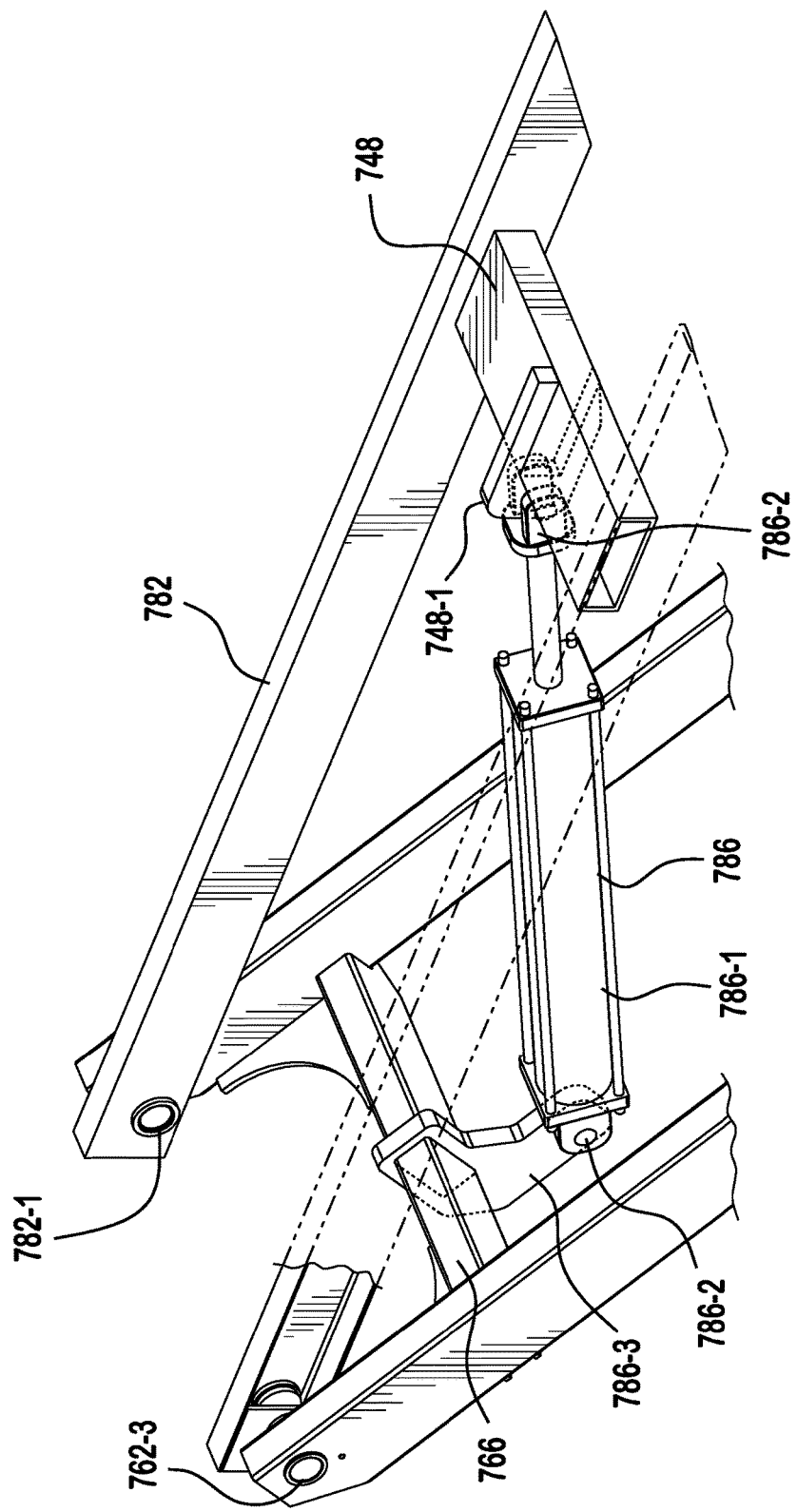
FIG. 8 is an enlarged perspective view of a part of the extension device of FIG. 6.

With reference to FIGS. 6 and 8, the storage bin platform section 78 is shown. The storage bin platform section 78 includes a pair of platform beams 782, a platform cross member 784, and a tilting actuator 786.

The pair of platform beams 782 are elongated structural beams and, as in the shown embodiment, are I-shaped metal beams. However, one skilled in the art should appreciate that other mechanically supports are possible, including tubular beams and various shaped metal supports. Each platform beam 782 includes a fastener receiving through-hole 782-1 positioned at a trailing end thereof and extending completely there through. The pair of platform beams 782 are positioned parallel to each other and connected to each other by the platform cross member 784.

The platform cross member 784 is a metal structural support extending between and secured to the pair of platform beams 782, positioned proximate a leading end of the pair of platform beams 782. In particular, the platform cross member 784 is mechanically secured to facing inner surfaces of the pair of platform beams 782, for instance, using a weld or other known mechanical fasteners. One skilled in the art should appreciate that other shapes and design are possible.

The platform cross member 784 includes a tilting actuator bracket 784-1 disposed on and mechanically secured to the platform cross member 784. In the shown embodiment, the tilting actuator bracket 784-1 is an eye bracket, however, one skilled in the art should appreciate other known brackets could be used. In addition, one skilled in the can appreciate that one or more tilting actuator brackets 784-1 can be used and positioned at different locations along the platform cross member 784.

As shown in FIGS. 6 and 8, the tilting actuator 786 is positioned between and connects the intermediate extension section 76 and the storage bin platform section 78. The tilting actuator 786 includes an actuator section 786-1, a pair of fastener sections 786-2, and an intermediate frame bracket 786-3. More particularly, in the shown embodiment, the actuator section 786-1 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure could be used.

Each fastener section 786-2 is positioned at an opposite end of the actuator section 786-1. A fastener section 786-2 connects the actuator section 786-1 to the tilting actuator bracket 784-1, and another fastener section 786-2 connects an opposite end of the actuator section 786-1 to the intermediate frame bracket 786-3. In the shown embodiment, each fastener section 786-2 is a rod clevis. One skilled in the art should appreciate that other known fasteners may be used that are capable of connecting between the intermediate extension section 76 and the storage bin platform section 78 through the tilting actuator 786.

A first end of the intermediate frame bracket 786-3 is connected to a fastener section 786-2. An opposite second end of the intermediate frame bracket 786-3 is formed to fixedly receive the second intermediate cross member 766, as shown in FIG. 8 and is capable of providing structural support to the tilting actuator 786.

With reference to the drawings, assembly of the mobile storage device 1 according to the invention will now be described.

The drive wheels 18 and the steerable wheels 20 are positioned under the undercarriage chassis 22, with the drive wheels 18 fixed to the chassis 22 and the steerable wheels 20 pivotably attached to the chassis 22 via the steering pivot assembly 24. In the embodiment shown in FIG. 1, the drive wheels 18 are positioned proximate the trailing end of the chassis 22, while the steerable wheels 20 are positioned at the leading end of the chassis 22. One with ordinary skill in the art would appreciate that other designs are possible; the steerable wheels 20, for instance, may alternatively be positioned at different positions along the undercarriage chassis 22.

The stabilizer 30 is securely positioned and attached within the chassis 22 between the first connecting beam 142 and the second connecting beam 144. The stabilizer 30 is positioned such that the pair of stabilizing actuators 38 and the pair of outriggers 32 extend diagonally downward with respect to the chassis 22.

The power system 40 is at least partially positioned on the power system support 16, and the remainder of the power system 40 is supported by the frame 10. The power system 40 is connected to the drive wheels 18 using a known transmission (not shown) and a hydraulic motor (not shown). Likewise, the power system 40 is also connected to the steerable wheels 20 and the stabilizer 30.

Figure 9:
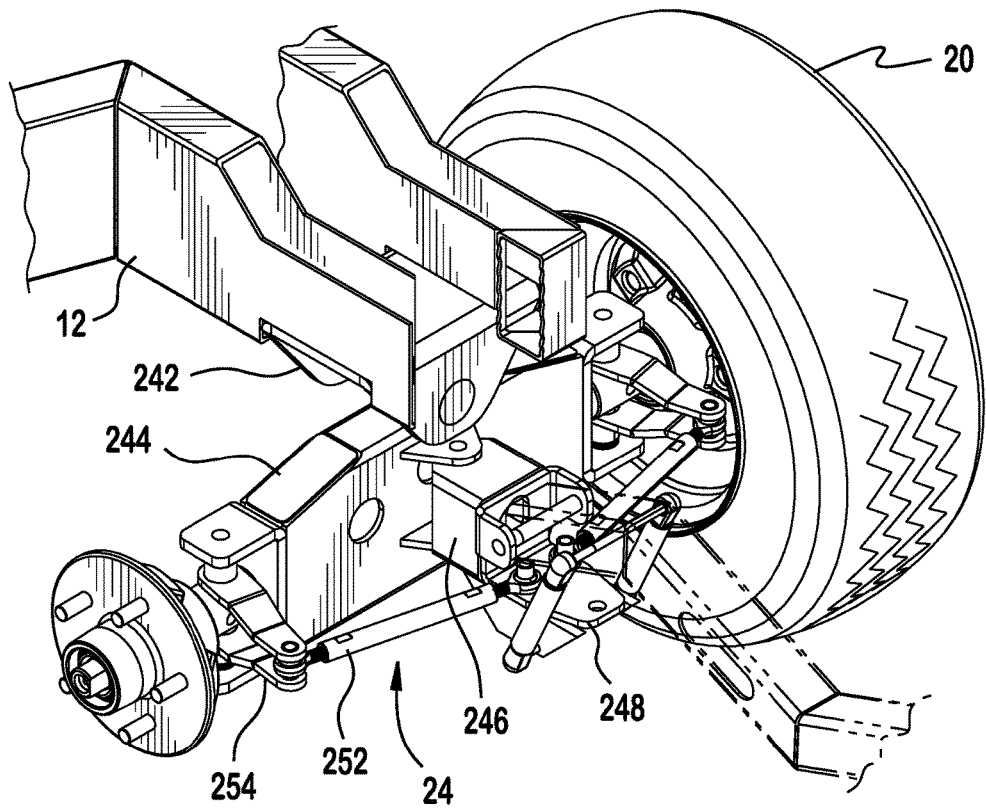
FIG. 9 is a perspective view of steerable wheels of the mobile storage device of FIG. 1.
Figure 10:
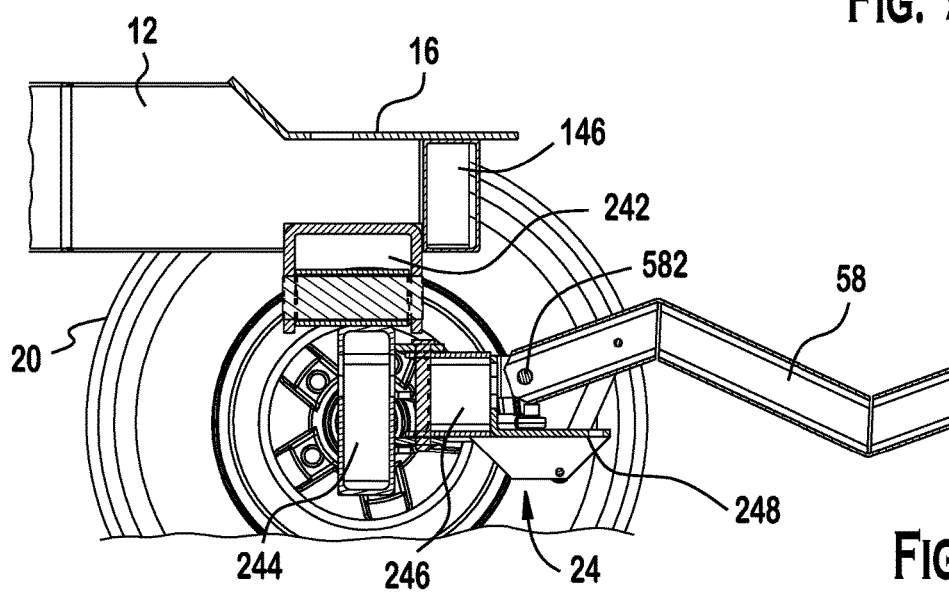
FIG. 10 is a side view of the steerable wheels of FIG. 9.

The control system 50, as shown in FIGS. 1, 9, and 10, is connected to the frame 10 at steering member receiving bracket 248. The steering member receiving bracket 248 aligns with the fastener receiving through-hole 582 of the steering link 58. A fastener, such as a locking pin, is positioned through the fastener receiving through-holes 582 and the steering member receiving bracket 248. The fastener is then secured and the steering link 58 mounted to the steerable wheel axle 244 of the frame 10; the steering link 58 rotates vertically with respect to the steerable wheel axle 244, but imparts motion on the steerable wheel axle 244 in a horizontal direction. One skilled in the art should appreciate that other fasteners could be used, including, nuts and bolts, screws, and pins. The control system 50 and control panel 56 are connected to the power system 40, the drive wheels 18, the steerable wheels 20, and the stabilizer 30.

The extension device 70, as shown in FIGS. 5-7 is secured to the frame 10. In particular, the leading end of the first base extension section 72 is secured to the leading end of the frame 10. The pair of first lower supports 722 are positioned within the pair of first support arm receiving spaces 122-1, such that the first fastener receiving through-holes 722-1 align with the first fastener receiving through-holes 122-2. A fastener, such as a locking pin, is positioned through each of the respective first fastener receiving through-holes 722-1, 122-2. The fastener is then secured and the first lower supports 722 are rotatably mounted to the frame 10. One skilled in the art should appreciate that other fasteners could be used, including, nuts and bolts, screws, and pins.

The trailing end of the second base extension section 74 is secured to the trailing end of the frame 10. The pair of second lower supports 742 are positioned within the pair of second support arm receiving spaces 124-1, such that the first fastener receiving through-holes 742-1 align with the second fastener receiving through-holes 124-2. A fastener, such as a locking pin, is positioned through the first fastener receiving through-holes 742-1 and the second fastener receiving through-holes 124-2. The fastener is then secured and the second lower supports 742 are rotatably mounted to the frame 10. One skilled in the art should appreciate that other fasteners could be used, including, nuts and bolts, screws, and pins.

Furthermore, the lifting actuator 748 also secures the second base extension section 74 to the frame 10, as shown in FIG. 7. In particular, the fastener section 748-2 at one end of the lifting actuator 748 is secured to the first actuator receiving bracket 744-1, while the base frame bracket 748-3 at the opposite end of the lifting actuator 748 fixedly receives the second connecting beam 144. The lifting actuator 748 is connected to the power system 40 using hoses and the hydraulic motor (not shown). The lifting actuator 748 is also connected to the control system 50.

As shown in FIG. 6, a trailing end of the first base extension section 72 is secured to a leading end of the intermediate extension section 76. In particular, the pair of first lower supports 722 are positioned to align the second fastener receiving through-holes 722-2 with the first fastener receiving through-holes 762-1 of the pair of intermediate supports 762. A fastener, such as a locking pin, is used to rotatably mount the first lower supports 722 and the intermediate supports 762. One skilled in the art should appreciate that other fasteners could be used, including, nuts and bolts, screws, and pins.

As also shown in FIG. 6, a leading end of the second base extension section 74 is secured approximately centrally to the intermediate extension section 76. In particular, the pair of second lower supports 742 are positioned to align the second fastener receiving through-holes 742-2 with the second fastener receiving through-holes 762-2 of the pair of intermediate supports 762. A fastener, such as a locking pin, is used to rotatably mount the second lower supports 742 and the intermediate supports 762. One skilled in the art should appreciate that other fasteners could be used, including, nuts and bolts, screws, and pins.

A trailing end of the intermediate extension section 76 is secured to a trailing end of the storage bin platform section 78, as shown in FIGS. 6 and 8. In particular, the pair of intermediate supports 762 are positioned to align the third fastener receiving through-holes 762-3 with the fastener receiving through-holes 782-1 of the pair of platform beams 782. A fastener, such as a locking pin, is used to rotatably mount the intermediate supports 762 and the platform beams 782. One skilled in the art should appreciate that other fasteners could be used, including, nuts and bolts, screws, and pins.

Furthermore, the tilting actuator 786 also secures the intermediate extension section 76 to the storage bin platform section 78. In particular, the fastener section 786-2 at one end of the tilting actuator 786 is secured to the tilting actuator bracket 784-1, while the intermediate frame bracket 786-3 at the opposite end of the tilting actuator 786 fixedly receives the second intermediate cross member 766. The tilting actuator 786 is connected to the power system 40 using hoses and the hydraulic motor (not shown). The tilting actuator 786 is also connected to the control system 50.

Figure 16:
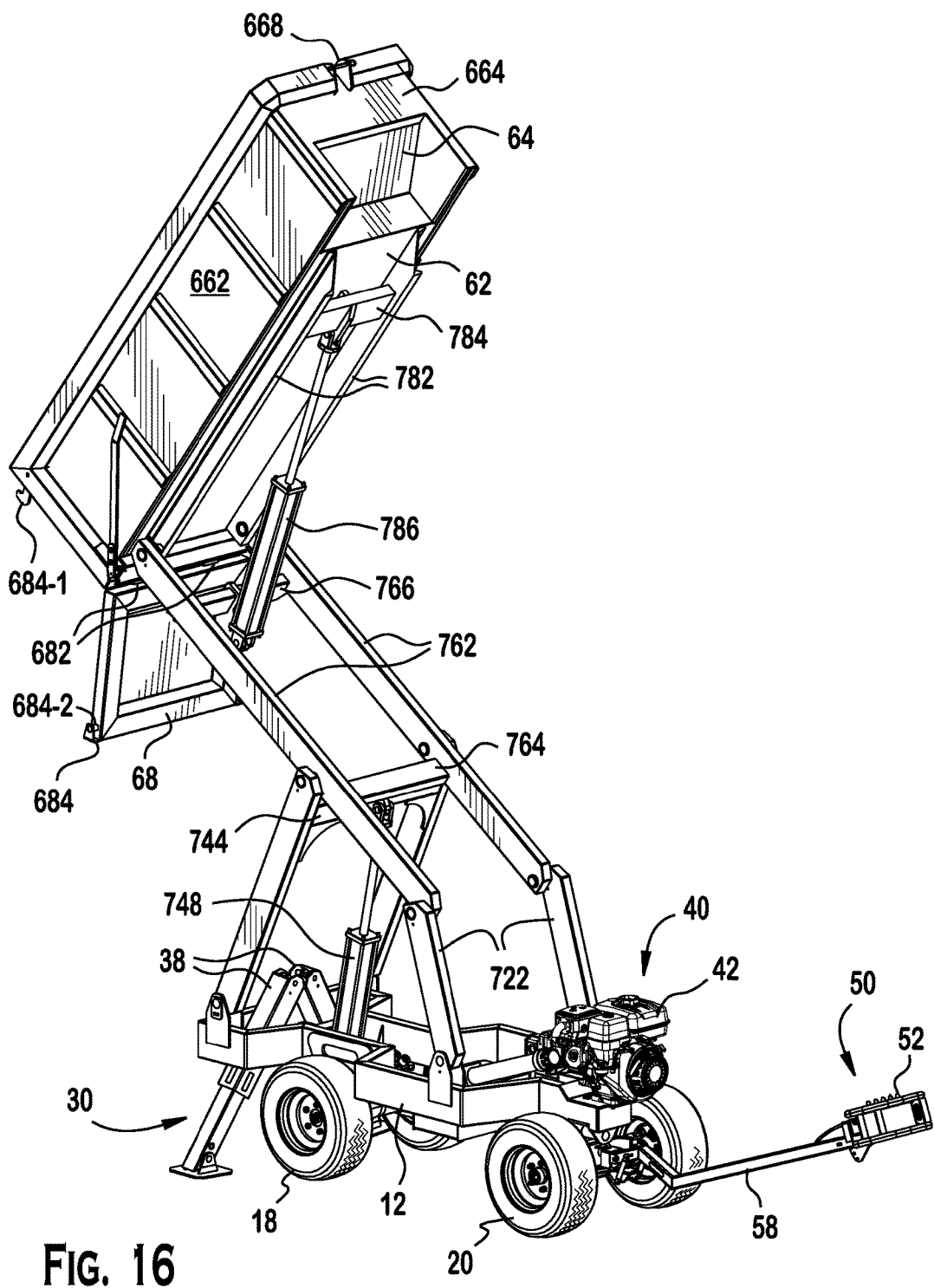
FIG. 16 is a perspective view of an extended and tilted mobile storage device of FIG. 1.

As shown in FIG. 16, the storage bin 60 is secured to the storage bin platform section 78. In the shown embodiment, the platform beams 782 are secured to the platform 62, for instance, using a mechanical weld. However, one skilled in the art should appreciate that other fastening mechanisms could be used, including, nuts and bolts, screws, and adhesives.

Now, with reference to FIGS. 1, 13, 15, and 16, operation of the mobile storage device 1 according to the invention will be described.

Building materials can be loaded and secured in the storage bin 60 at a location different than the work site. When the mobile storage device 1 is in a lowered position shown in FIG. 1, with the stabilizer 30 in a retracted position, a user uses the control system 50 to move the mobile storage device 1. The user operates the control system 50 to drive the power system 40; the control elements 562 are used to control power to the drive wheels 18, imparting motion to the mobile storage device 1 in either a forward or reverse direction, along with braking of the drive wheels 18. The user may also physically pull the mobile storage device 1 using the control system 50, without operating the drive system 40 or control system 50.

Figure 13:
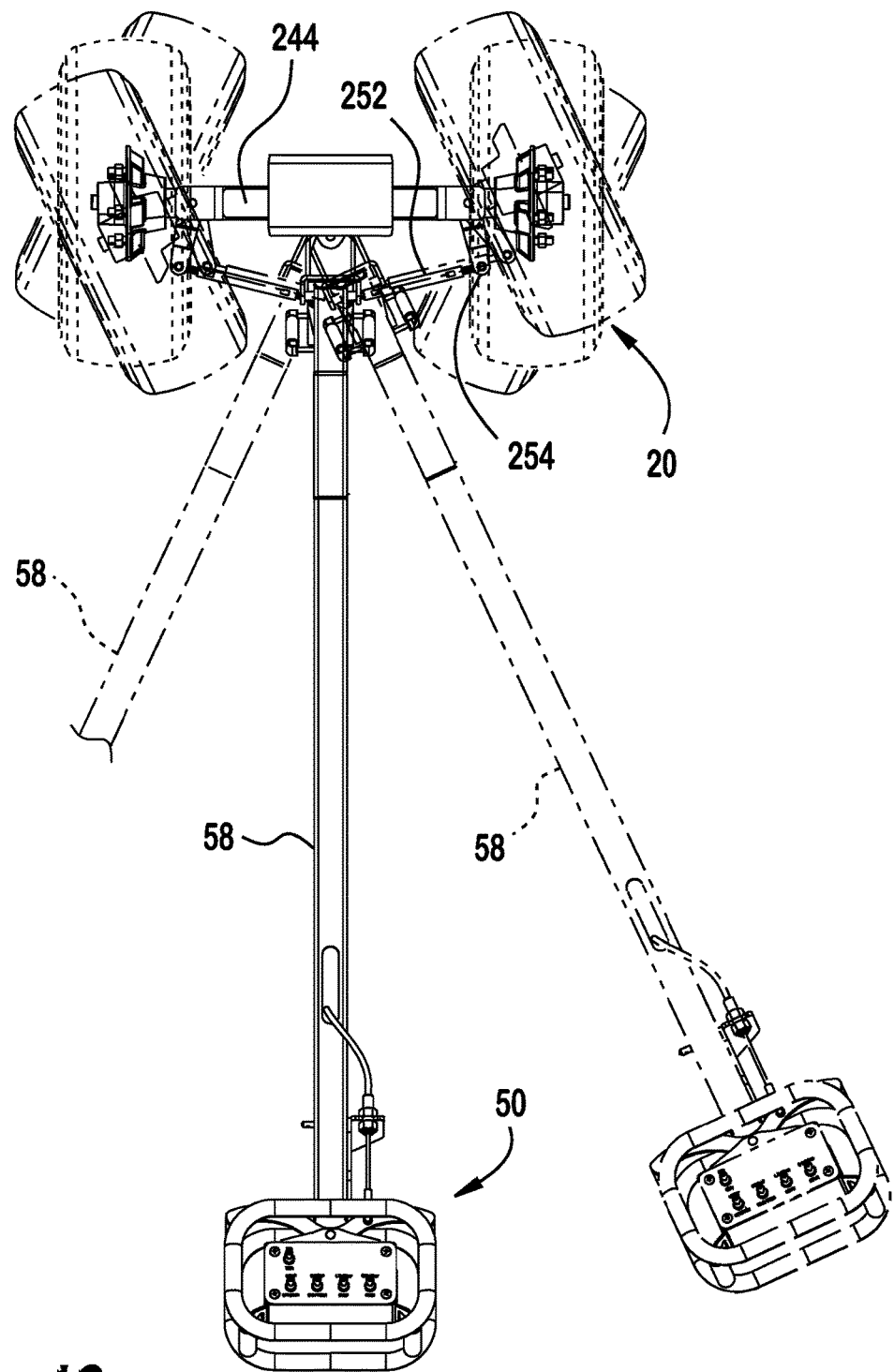
FIG. 13 is a schematic top view of the control system of FIG. 11 and the steerable wheels of FIG. 9.

As shown in FIG. 13, in order to turn the mobile storage device 1, the user physically moves the control system 50 in a left or right direction. While the steerable wheel axle 244 remains in the same position, the motion of the control system 50 pivots the front brace 246 with respect to the steerable wheel axle 244, moving the pair of steering arms 252 to pivot the pair of wheel brackets 254 about the steerable wheel axle 244 in the steering direction. The control system 50 allows the user to move the mobile storage device 1 to a desired location at a work site.

Once the operator has determined that the mobile storage device 1 is in position to, for example, unload building materials from the storage bin 60, the user can control the stabilizers 30 using the control system 50 to extend the stabilizers 30 to support and level the mobile storage device 1. The operator then uses the control system 50 to control the extension device 70 and position of the storage bin 60.

FIG. 15 shows a position of the mobile storage device 1 in which the user has stabilized the mobile storage device 1 with the stabilizers 30, and has positioned the storage bin 60 by controlling the lifting actuator 748 of the extension device 70. By adjusting the different angles of the first base extension section 72, the second base extension section 74, the intermediate extension section 76, and the storage bin platform section 78 with respect to each other and the frame 10, the operator can adjust the height of the storage bin 60. Furthermore, by using the control system 50 to operate the tilting actuator 786, the user can adjust the tilting angle of the storage bin 60.

When the user has finished using the extended storage bin 60, the user may implement the control system 50 to tilt and lower the storage bin 60, and raise the stabilizers 30. The user may then again re-locate the mobile storage device 1 using the control system 50.

Additionally, in the embodiment shown in FIG. 1, the steering link 58 may be secured by the link securing member 668 when the mobile storage device 1 is not in use, for example, when the storage bin 60 is loaded at ground level. The user removes the link fastener 668-2 from the link securing passageway 668-1 to lower the control system 50 and move the mobile storage device 1, and can return the steering link 58 to the link securing passageway 668-1, securing the steering link 58 with the link fastener 668-2, when operation of the mobile storage device 1 is complete.

The foregoing illustrates some of the possibilities for practicing the invention. Many other embodiments and fields of use for the mobile storage device 1 are possible and within the scope and spirit of the invention. It is therefore intended that the foregoing description be regarded as illustrative rather than limiting.

What is claimed is:

1. A mobile storage device, comprising:
a frame having:
a plurality of support beams extending a length thereof;
a connecting beam abutting a pair of the plurality of support beams; and
a base frame bracket secured to the connecting beam along a section of the connecting beam;
a power system positioned on the frame;
a pair of drive wheels positioned at one end of the plurality of support beams and powered by the power system;
a pair of steerable wheels positioned on a leading end of the frame and opposite the pair of drive wheels, the pair of steerable wheels pivotally attached to the frame through a steering pivot assembly;
a storage bin extendable above the frame and having a storage bin platform section;
an extension device secured to and rotatably connected to the frame, the extension device having:
a first base extension section with a leading end rotatably connected to a leading end of the frame and having a pair of first lower supports positioned on opposite sides of the frame between the pair of drive wheels and the pair of steerable wheels;
a second base extension section having a pair of second lower supports connected together by a second base extension cross member and positioned on opposite sides of the frame and trailing ends rotatably connected to a trailing end of the frame; and
an intermediate extension section having:
a pair of intermediate supports with a leading end rotatably connected to a trailing end of the first pair of lower supports and a trailing end rotatably connected to the storage bin platform section;
a first intermediate cross member connecting the pair of intermediate supports and positioned between a leading end and a trailing end thereof; and
a second base extension cross member connected to the pair of intermediate support and positioned proximate the trailing end thereof;
a lifting actuator positioned between and connecting the second base extension cross member and the base frame bracket;
a titling actuator positioned between and connecting the second base extension cross member and the storage bin platform section; and
a control system connected to the power system and having a steering link connected to the steering pivot assembly and rotatable with respect to the frame.

2. The mobile storage device of claim 1, wherein the control system includes a handle.

3. The mobile storage device of claim 2, wherein the control system further includes a control panel.

4. The mobile storage device of claim 3, wherein the handle extends around the control panel and is sized to permit manual manipulation by an operator.

5. The mobile storage device of claim 4, wherein the control panel includes a plurality of control elements.

6. The mobile storage device of claim 5, wherein the control elements include a speed control element and a braking control element.

7. The mobile storage device of claim 1, wherein the steering link is an elongated shaft attached to and extending away from the handle.

8. The mobile storage device of claim 7, wherein the steering link includes a fastener receiving through-hole extending completely there through.

9. The mobile storage device of claim 8, wherein the fastener receiving through-hole is positioned at an opposite end thereof with respect to the handle.

10. The mobile storage device of claim 9, wherein a first end of the steering link is attached to the handle.

11. The mobile storage device of claim 10, wherein an opposite second end of the steering link is rotatably connected to the pair of steerable wheels.

12. The mobile storage device of claim 11, wherein the steering link rotates about a horizontal axis with respect to the frame.

13. The mobile storage device of claim 12, wherein motion of the steering link about a vertical axis pivots the pair of steerable wheels laterally with respect to the frame.

14. The mobile storage device of claim 13, wherein each of the pair of steerable wheels is connected to one of a pair of wheel brackets.

15. The mobile storage device of claim 14, wherein the pair of wheels brackets are pivotably connected to the frame.

16. The mobile storage device of claim 15, wherein the steering link is connected to a pair of steering arms.

17. The mobile storage device of claim 16, wherein each of the pair of steering arms connects the steering link to one of the pair of wheel brackets.

18. The mobile storage device of claim 17, wherein motion of the steering link about a vertical axis pivots the pair of steerable wheels via the pair of steering arms and the pair of wheel brackets.

19. The mobile storage device of claim 1, further comprising a pair of drive wheels attached to the frame and connected to the control system.

20. The mobile storage device of claim 1, wherein the lifting actuator is connected to the control system.

21. The mobile storage device of claim 1, wherein the extension device further includes a tilting actuator positioned between and connecting the intermediate extension section and the storage bin platform section.

22. The mobile storage device of claim 21, wherein the tilting actuator is connected to the control system.

23. The mobile storage device of claim 1, wherein the storage bin includes a platform, a plurality of retaining walls extending upward from the platform, and a tailgate having an end rotatable away from the plurality of retaining walls.

24. The mobile storage device of claim 23, wherein the storage bin further includes a cutout section extending from an end of the platform.

25. A mobile storage device, comprising:
   a frame having:
      a plurality of support beams extending a length thereof;
      a connecting beam abutting a pair of the plurality of support beams; and
      a base frame bracket secured to the connecting beam along a section of the connecting beam;
   a pair of rear wheels positioned at one end of the plurality of support beams;
   a pair of steerable wheels positioned on a leading end of the frame and opposite the pair of rear wheels;
   a platform section extendable above the frame; and
   an extension device secured to and rotatably connected to the frame, the extension device having:
      a first base extension section having a pair of first lower supports with leading ends rotatably connected to the frame between the pair of rear wheels and the pair of steerable wheels;
      a second base extension section having a pair of second lower supports connected together by a second base extension cross member and positioned on opposite sides of the frame and trailing ends rotatably connected to a trailing end of the frame; and
      an intermediate extension section having:
         a pair of intermediate supports with a leading end rotatably connected to a trailing end of the first pair of lower supports and a trailing end rotatably connected to the storage bin platform section;
         a first intermediate cross member connecting the pair of intermediate supports and positioned between a leading end and a trailing end thereof; and
         a second base extension cross member connected to the pair of intermediate support and positioned proximate the trailing end thereof; and
      a lifting actuator positioned between and connecting the second base extension cross member and the base frame bracket; and
      a titling actuator positioned between and connecting the second base extension cross member and the storage bin platform section.

26. The mobile storage device of claim 25, wherein each first lower support of the pair of first lower supports includes a first fastener receiving through-hole positioned at a leading end thereof and extending completely there through and a second fastener receiving through-hole positioned at a trailing end thereof and extending completely there through.

27. The mobile storage device of claim 25, wherein the pair of first lower supports are positioned parallel to each other.

28. The mobile storage device of claim 25, wherein the pair of second lower supports are positioned parallel to each other.

29. The mobile storage device of claim 25, wherein the second base extension section includes a pair of second lower supports and a pair of braces.

30. The mobile storage device of claim 29, wherein the pair of second lower support includes a first fastener receiving through-hole positioned at a trailing end thereof and extending completely there through and a second fastener receiving through-hole positioned at a leading end thereof and extending completely there through.

31. The mobile storage device of claim 29, wherein the second base extension cross member is positioned proximate the leading edge of each of the pair of second lower supports to connect and secure the pair of second lower supports in a parallel position.

32. The mobile storage device of claim 29, wherein the second base extension cross member is mechanically secured to facing inner surfaces of the pair of second lower supports.

33. The mobile storage device of claim 25, wherein the lifting actuator includes an actuator section, a pair of fastener sections, and the base frame bracket.

34. The mobile storage device of claim 33, wherein each fastener section of the pair of fastener sections is positioned at an opposite end of the actuator section.

35. The mobile storage device of claim 34, wherein a first fastener section connects the actuator section to an actuator receiving bracket and a second fastener section connects an opposite end of the actuator section to the base frame bracket.

36. The mobile storage device of claim 25, wherein each of the pair of intermediate supports includes:
   a first fastener receiving through-hole positioned at a leading end thereof and extending completely there through;

a second fastener receiving through-hole positioned between the leading end and a trailing end thereof and extending completely there through; and
  a third fastener receiving through-hole positioned at the trailing end thereof and extending completely there through.

37. The mobile storage device of claim 36, wherein the first base extension section rotatable about each first fastener receiving through-hole.

38. The mobile storage device of claim 37, wherein the platform section is rotatable about each third fastener receiving through-hole.

39. The mobile storage device of claim 38, wherein the second base extension is rotatable about each second fastener receiving through-hole.

40. The mobile storage device of claim 25, wherein the lifting actuator is connected to a control system.

41. The mobile storage device of claim 40, wherein the extension device further includes a tilting actuator positioned between and connecting the intermediate extension section and the platform section.

42. The mobile storage device of claim 41, wherein the tilting actuator is connected to the control system.

43. The mobile storage device of claim 1, further comprising a storage bin positioned and secured to the platform section.

* * * * *